United States Patent [19]

Mark

[11] Patent Number: 4,660,793
[45] Date of Patent: Apr. 28, 1987

[54] APPLIANCE MOUNTING APPARATUS

[75] Inventor: Andrew Mark, Stamford, Conn.

[73] Assignee: Salton, Inc., Deerfield, Ill.

[21] Appl. No.: 742,758

[22] Filed: Jun. 10, 1985

[51] Int. Cl.[4] ............................................. A47B 96/06
[52] U.S. Cl. .............................. 248/231.8; 248/316.7; 248/224.4
[58] Field of Search ............... 248/225.1, 225.2, 221.3, 248/497, 224.3, 224.4, 311.2, 231.8, 309.1, 314, 316.2, 316.7, 231.9, 205.1, 225.2, 224.4, 311.2, 316.7, 231.8; 312/245

[56] References Cited

U.S. PATENT DOCUMENTS

| 1,862,466 | 6/1932 | Buecker | 284/225.2 |
| 2,979,300 | 4/1961 | Howell | 284/225.2 |
| 3,110,467 | 11/1963 | Dube | 248/311.2 |
| 3,669,035 | 6/1972 | Grossman | 248/225.2 |
| 4,056,250 | 11/1977 | Uchiyama | 248/674 |
| 4,076,204 | 2/1974 | Kalka | 248/580 |
| 4,085,867 | 4/1978 | Heller | 248/224.4 |

FOREIGN PATENT DOCUMENTS

| 2402623 | 7/1975 | Fed. Rep. of Germany ... 248/221.3 |
| 2037572 | 7/1980 | United Kingdom ............ 248/225.2 |

Primary Examiner—Reinaldo P. Machado
Assistant Examiner—Alvin Chin-Shue
Attorney, Agent, or Firm—Ronald A. Sandler; Jerry A. Schulman; Timothy T. Patula

[57] ABSTRACT

An apparatus and system for mounting articles to a supporting surface by a mounting bracket, having engaging fingers formed thereon to register with an engage corresponding sockets extend into the article to be mounted. A system is also disclosed with a mounting bracket having parallel arms away from the supporting surface, said arms corresponding to sockets formed upon the article to be mounted.

4 Claims, 6 Drawing Figures

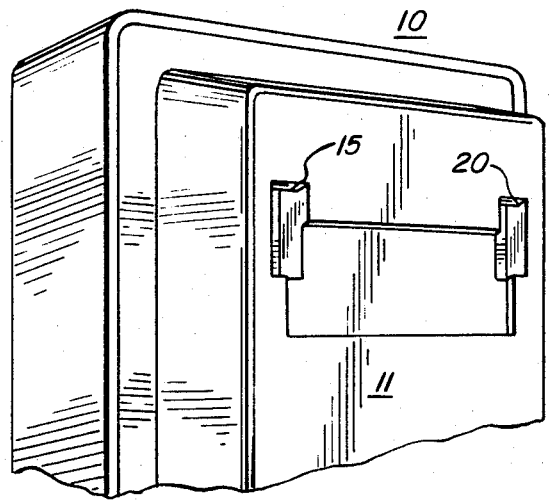
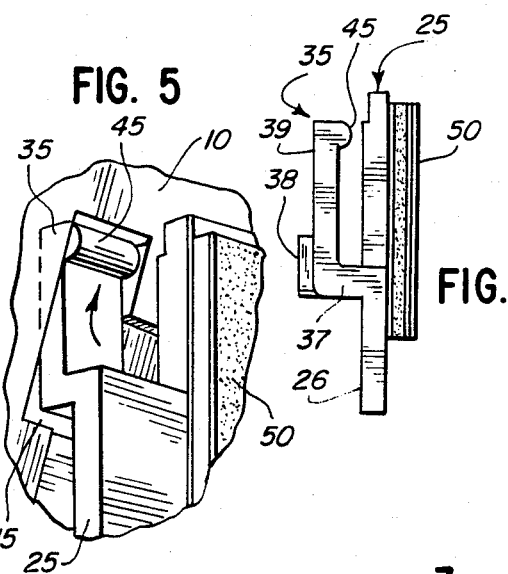
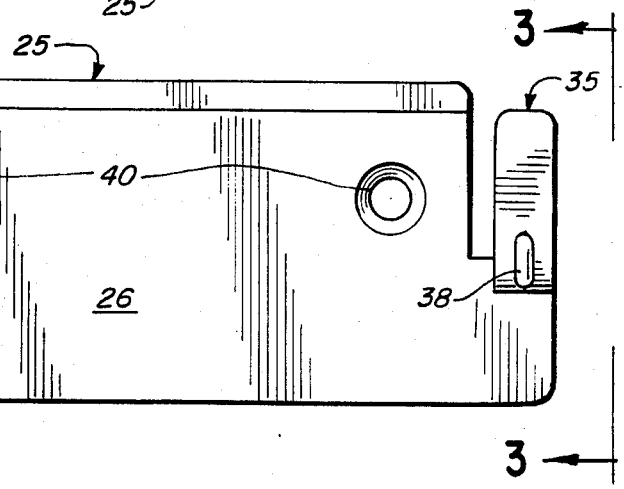
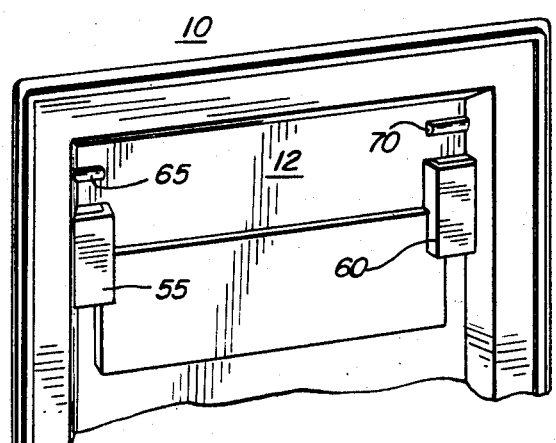
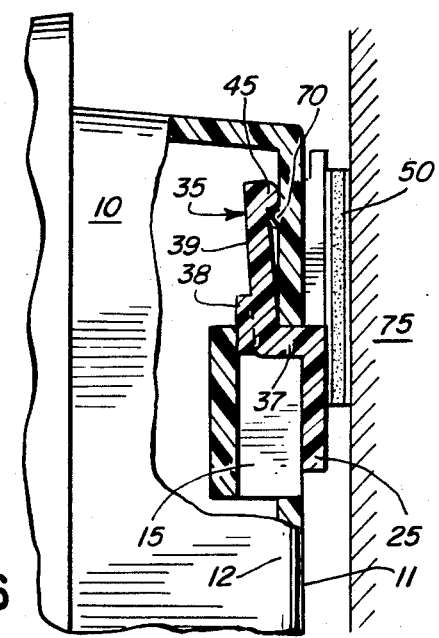

APPLIANCE MOUNTING APPARATUS

The present invention relates generally to apparatus and systems for removably supporting and mounting small appliances, cabinets and the like from a planar surface and, more particularly, from a vertically-extending surface such as a wall.

BACKGROUND OF THE INVENTION

Mounting small household appliances, such as radios, clocks, coffee makers, and the like, to supporting surfaces such as walls, shelves, and cabinets offers numerous desired advantages. Modern appliances may be more effectively used when mounted in safe and convenient positions. One popular mounting site for such items as radios and clocks, is the face of a typical bank of kitchen cabinets or directly to a wall. Another such site would be the underside of a shelf, either mounted to a wall, or a workbench or installed in a bookcase.

Because many such appliances are battery operated, it is often necessary to remove them from their display portion to change batteries. Applicant's invention affords secure mounting of an article which allows repeated removal and remounting.

Applicant's invention provides advantages over previous systems. It allows a sturdy form of support for such articles; it utilizes a minimum amount of permanent hardware; and the article may be easily detached and replaced numerous times without appreciable wear of the mounting devices or the supporting surface.

Numerous other advantages and features of the invention will become readily apparent from the following detailed description of the preferred embodiment of the invention, from the claims and from the accompanying drawings, in which like numerals are employed to designate like parts throughout the same.

BRIEF SUMMARY OF THE INVENTION

A mounting channel or a series of mounting sockets is formed on the surface of an article to be supported. The sockets open toward the supporting surface. A mounting bracket is formed and dimensioned with indented and extending arms to interengage the mounting sockets, by latching and gripping a knurl formed inside the article. The mounting bracket is affixed solidly to the supporting surface by a conventional fastening means such as by screws, glue or double-sided tape. In a preferred embodiment, the mounting bracket has two extending arms to equally support the article.

BRIEF DESCRIPTION OF THE DRAWINGS

A fuller understanding of the foregoing may be had by reference to the accompanying drawings, wherein:

FIG. 1 is a perspective view of an article cabinet constructed in accordance with a preferred embodiment of the present invention;

FIG. 2 is a front view of the mounting bracket parallel to the plane of the prospective mounting surface;

FIG. 3 is a side view of the mounting bracket taken in the direction of the arrows 3—3 in FIG. 2;

FIG. 4 is a perspective internal view of the article cabinet of FIG. 1;

FIG. 5 is a perspective view of the mounting bracket on its supporting surface with the article cabinet in the process of being interengaged; and FIG. 6 is a partial sectional view of the article cabinet mounted on the mounting bracket, with the bracket affixed to a vertical support surface.

DETAILED DESCRIPTION OF THE INVENTION

While the invention is susceptible of embodiment in many different forms, there is shown in the drawings and will herein be described in detail a preferred embodiment of the invention. It should be understood, however, that the present disclosure is to be considered as an exemplification of the principles of the invention and is not intended to limit the spirit and scope of the invention and/or claims to the embodiment illustrated.

Referring now to FIG. 1, the numeral 10 indicates generally a cabinet of an article to be mounted. Parallel mounting sockets 15 and 20 are depicted on a rear wall 11 of article cabinet 10 which is to be mounted to an associated supporting surface 75, as seen in FIG. 6. The mounting sockets 15, 20 may be formed in any number of desired locations on wall 11 of the article cabinet 10.

FIG. 2 is a front view of an associated mounting bracket 25, as positioned parallel to the plane of supporting surfaces 75. In the embodiment shown, mounting bracket 25 has a pair of identically offset extending arms 30 and 35, extending from a front surface 26 of mounting bracket 25. Mounting apertures 40 are located along the front surface 26 of mounting bracket 25. Apertures 40 allow screws or other fastening devices (not herein specifically shown) to be inserted through the mounting bracket 25 and into supporting surface 75. Reinforcement ribs 38, located on extending arms 30 and 35 as seen in FIG. 2, stiffen and strengthen arms 30 and 35.

FIG. 3 is a side view of the mounting bracket 25 depicting extending arm 35. Preferably, arm 30 (not shown in FIG. 3) is identical to arm 35 and therefore only arm 35 will be described in detail. Extending arm 35 includes a laterally directed arm offset portion 37, extending at right angles to arm segment 39 and parallel to front surface 26 of bracket 25. A reversely directed gripping and latching projection 45 is formed proximate the tip of arm segment 39. Reinforcement rib 38 is positioned on arm segment 39 near the lateral portion 37 thereof. Mounting means 50 exemplified herein in the form of double-sided tape attached to the support surface side of mounting bracket 25 is provided to facililate attachment of the mounting bracket 25 to surface 75.

FIG. 4 depicts an internal view of the article cabinet 10, illustrating the rear faces 55 and 60, which are the internal protusions of mounting sockets 15 and 20 as shown in FIG. 1. Also shown are a pair of inwardly extending knurls 65 and 70 formed in the rear wall 12 of cabinet 10. The knurls 65 and 70 are parallel to sockets 15 and 20 and disposed one from the other at a distance approximately equal to the distance between arms 30 and 35 on mounting bracket 25.

FIG. 5 is a perspective view of the article cabinet 10 and mounting bracket 25 in the process of being engaged. Mounting bracket 25 with extending arm 35 and gripping and latching projection 45 is depicted in the process of being interengaged with mounting socket 15 of article cabinet 10. Also shown is mounting means 50 on the supporting surface side of the mounting bracket 25.

FIG. 6 is a partial sectional side view of the article cabinet 10 as mounted on mounting bracket 25. Arm 35 is engaged within the cabinet 10, parallel to rear wall 11 of article cabinet 10 through mounting socket 15 along bottom 60, such that the extending arm segment 39 biases the respective latch projection 45 over knurl 70 as formed in the rear face 12 of wall 11 of article 10. Likewise, though not shown, extending arm 30 of mounting bracket 25 is engaged through mounting socket 20 and bottom 55 to a point where gripping and latching projection 45 of extending arm 30 is latched over knurl 65 as formed in cabinet article 10. The reinforcing ribs 38, positioned at lateral portions 37, afford additional strength to arms 30 and 35 and abut sockets 15 and 20 and wall 60.

Use of the system of the present invention is simply and effectively described as follows. Once the mounting location of article cabinet 10 is determined, the mounting bracket 25 is affixed to the associated supporting surface 75 by mounting means 50, such as illustrated by double-sided tape or by fasteners disposed through the mounting apertures 40 into supporting surface 75 or by glue or hook and loop-type strip fasteners, such as those sold under the trademark Velcro.

After the mounting bracket 25 is secured to surface 75, the article cabinet 10 may be placed on the mounting bracket 25. The article cabinet 10 is diposed at an angle away from the plane of the mounting bracket 25 and supporting surface 75, and extending arms 30 and 35 are inserted into the respective mounting sockets 15 and 20, as depicted in FIG. 5. The extending arms 30 and 35 are forced past the knurls 65 and 70, and because of their resiliency, and reinforcement means 38, grip and latch into place over the knurls 65 and 70. In addition, the reinforcement means 38 also engages the channelback (60 in FIG. 6) to assure that the arm is locked in a stationary position. Article cabinet 10 should be given a slightly downward tug to assure that latching projections 45 have firmly interengaged knurls 65 and 70 respectively.

When it is desired to remove article cabinet 10 from the associated supporting surface 75, sufficient force is applied to disengage extending arms 30 and 35 (and the corresponding gripping and latching projections 45) from knurls 65 and 70. This will enable article cabinet 10 to be removed from the mounting bracket 25 by sliding the article cabinet 10 upward and away from the bracket 25, until the extending arms 30 and 35 have cleared sockets 15 and 20 and article 10 is free of mounting bracket 25.

It is contemplated that arms 30 and 35 and, indeed, bracket 25 will be formed of any well-known thermoplastic material which, though rigid when cast or molded, affords sufficient resiliency and plastic memory to projecting members such as arms 30 and 35 to enable such projections to be deflected numerous times while resiliently urging them toward their original configurations and orientations.

While the foregoing has presented certain specific embodiments of the present invention, it is to be understood that these embodiments have been presented by way of example only. It is expected that others will perceive differences which, while bearing from the foregoing, do not depart from the spirit and scope of the invention herein described and claimed.

What is claimed is:

1. Mounting apparatus for removably mounting an article to an associated generally planar supporting surface, said apparatus comprising:
   a mounting bracket having a main wall adapted to be fixedly secured in parallel relationship to the associated support surface;
   said mounting bracket having at least one arm integral therewith and extending therefrom, said arm including a projecting lateral portion and an offset elongated and resilient finger portion integral with said lateral portion, said finger portion being generally parallel to said bracket main wall;
   the distal end of said finger portion being provided with a reversely directed latch member extending toward said main wall and terminating at a spaced distance therefrom;
   an article to be removably mounted on the associated surface, said article including a rear wall having an inner surface and an outer surface intended to be generally co-planar to the associated supporting surface, said rear wall having at least one mounting site formed therein, said mounting site including an aperture formed in said wall and defining a socket therein adapted to receive said finger portion of said mounting member in complementary fashion, and a knurl formed on the inner side of said rear wall and spaced from said socket, whereby upon insertion of said finger portion through said aperture and into said socket said latch member will overly and engage said knurl thereby to detachably secure said article to said mounting bracket, and means on said finger portion for forcibly engaging a portion of said socket so as to assure that said latch member and said knurl do not accidentally disengage.

2. The apparatus of claim 1, further including means on said finger portion of said mounting bracket for reinforcing said finger portion and for frictionally engaging a portion of said socket so as to assure that said latch member and said knurl do not accidentally disengage.

3. The apparatus of claim 1, wherein said mounting bracket includes more than one of said offset arms, and said rear wall of said article includes a corresponding number of said sockets thereon, said sockets being positioned and dimensioned to register each said offset arm with one said socket.

4.
The apparatus of claim 3 wherein each said socket includes wall means for guiding and retaining each said finger portion when said article is mounted to said support surface.

* * * * *